Nov. 20, 1962 P. J. BARNES 3,065,355
MARKER SENSING DEVICE
Filed Dec. 24, 1959
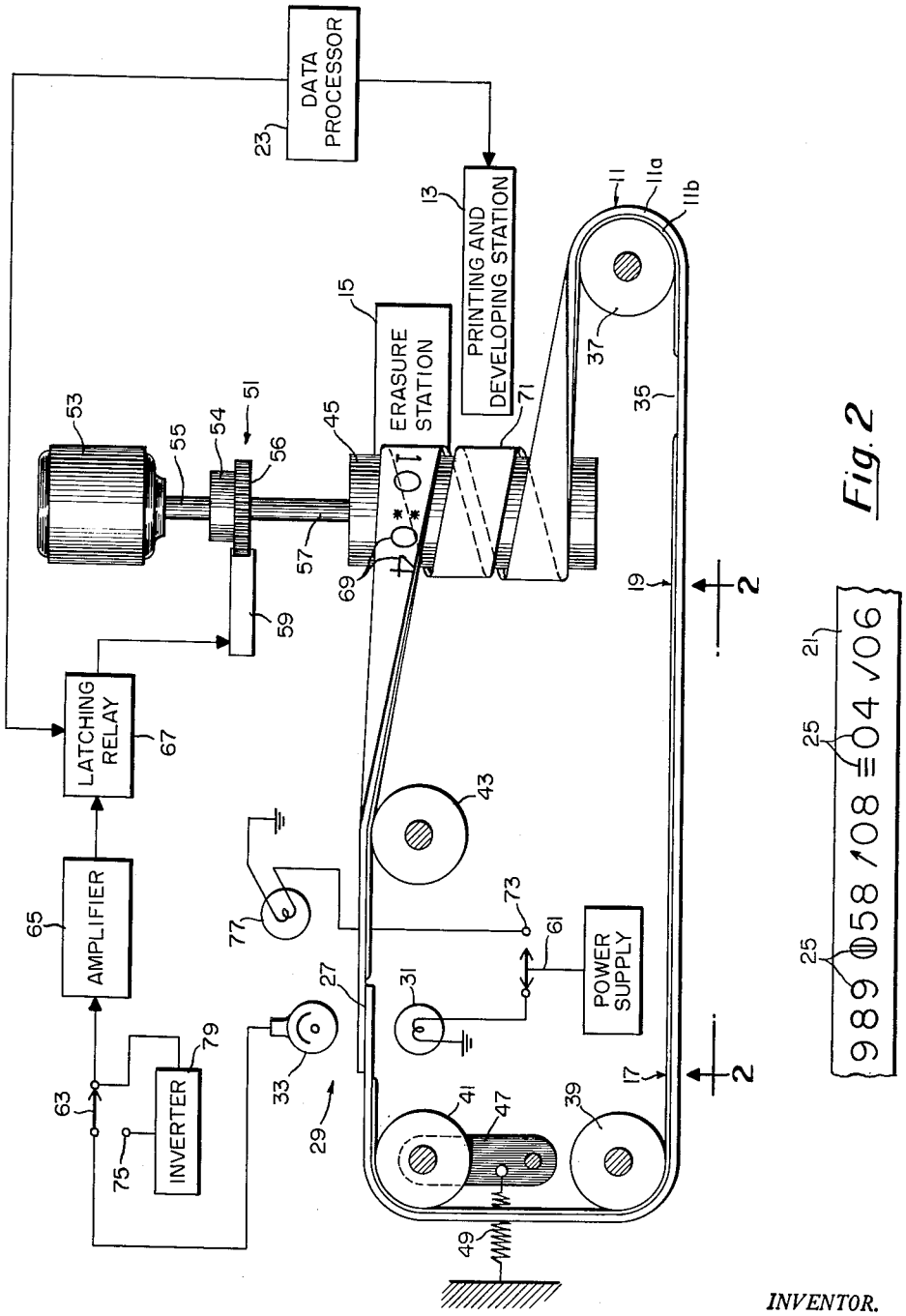
*Fig.1*  *Fig.2*
INVENTOR.
PERCY J. BARNES
BY William E. Cleaver
ATTORNEY ns # United States Patent Office 3,065,355
Patented Nov. 20, 1962

3,065,355
MARKER SENSING DEVICE
Percy J. Barnes, Wilmington, Del., assignor to Burroughs Corporation, Detroit, Mich., a corporation of Michigan
Filed Dec. 24, 1959, Ser. No. 861,942
6 Claims. (Cl. 250—219)

This invention relates to an arrangement for selectively moving an endless tape.

Endless tapes, or belts, generally take one of three forms: (1) a length of tape, or belt, may have its free ends joined together in a splice to form a continuous tape, (2) a tape, or belt, may have its free ends held together by some device such as a clamp so that the ends abut one another thereby forming a continuous tape, or (3) a tape, or belt, may be molded to form an endless tape without a splice, or without a joint whereat the free ends abut each other.

The technique of producing an endless tape with a splice has the advantage that an endless tape of any length (within practical limits) may be formed quite readily. It is simply a matter of cutting the tape the proper length so that when its free ends are joined together in a splice, the resultant continuous tape will have a periphery of the correct length to do the particular job. An endless tape with a splice, however, has a disadvantage in that the splice very often does not permit the tape to move smoothly over its designated travel path, does not present a smooth surface and/or does not provide a uniform thickness, because the splice introduces a distorted shape in the area of the splice.

The technique of forming an endless tape by joining the free ends together so that they are abutting each other can also readily provide tapes of various lengths, and such a resultant tape has an advantage in that it enables a relatively smooth movement over its designated path. However, such a tape has disadvantages, namely, that it is more difficult to join two free ends together in an abutting fashion than it is to splice them, and very often at the point of joining there is a gap between the ends which in effect constitutes an unsmooth surface.

The molded tape has the advantage, of course, that there is no area whereat the free ends are joined and therefore there is no distorted shape. This enables the molded tape to provide a smooth surface and a smooth movement. However, there is a disadvantage in that there is little flexibility in belt or tape size once the mold has been made unless the tape is converted into one of the two tapes mentioned above.

The present invention takes advantage of the spliced area, or the clamped area, which heretofore has been considered an infirmity in an endless tape of the type having either a splice or clamped-free ends.

It is an object of the present invention to provide an improved means for moving an endless tape having free ends which are joined.

It is a further object of the present invention to provide an improved means for selectively moving a message display tape.

In accordance with a main feature of the present invention the endless tape is translucent and provided with an opaque backing, or a reflecting backing, along the entire tape excepting in the area of the splice and other markers.

In accordance with another feature there is provided a light source means and a light-sensitive means positioned to respectively transmit and receive light passed through the tape, or reflected from the tape, in order to produce a signal which indicates the presence of a spice or a marker.

In accordance with another feature, circuitry means are provided to transmit a signal produced by the light-sensitive means of the last-mentioned feature to tape driving means to effect an interruption of the movement of the tape.

The foregoing and other objects and features of this invention will be best understood by reference to the following description of an embodiment of the invention taken in conjunction with the accompanying drawings, wherein:

FIG. 1 is a schematic drawing of a message display tape arrangement;

FIG. 2 is a face view of the tape showing a weather message, taken along the line 2—2 of FIG. 1.

The present invention is described in connection with a message display arrangement. There are many varied uses for an arrangement which can display a message, and which can remove an old message to display a new message in response to incoming intelligence. For instance, the latest news item displayed in a moving fashion around the Times Building at Times Square in New York city is a well-known example of such an arrangement.

On a smaller scale such a message display arrangement is desirable for displaying present weather conditions in symbolic form at the control tower and the operation room of an airport. The device shown schematically in FIG. 1 is such a present weather display means.

The arrangement in FIG. 1 makes use of electrostatic printing principles which enable a message to be printed on the tape 11 by virtue of the printing and developing station 13, and erased from the tape 11 by virtue of the erasure device 15. In accordance with this operation a weather message is printed on tape 11 and moved into a position bounded by points 17 and 19, and stopped thereat to be displayed as shown in FIG. 2, by the tape section 21. After the message has been displayed, the tape, including the printed portion, is passed through the erasure station 15 whereas the message is removed leaving a clean tape, ready to have a new message printed on its surface at the printing and developing station 13. The principles of electrostatic printing are described and claimed in copending U.S. applications entitled "Electrographic Recording Process," by Epstein et al., Serial No. 714,761, filed February 12, 1958, and now abandoned, and "Electrographic Recording Apparatus," by Benn et al., Serial No. 734,253, filed May 9, 1958, both of which applications are assigned to the Burroughs Corporation. The operation of the erasure device 15 is described and claimed in my copending application entitled Electrostatic Data Display, Serial No. 861,906, filed December 24, 1959, which is also assigned to the Burroughs Corporation.

The tape 11 in FIG. 1 is shown with exaggerated dimensions in order to illustrate the translucent portion 11a and the metallic backing 11b. The translucent portion 11a may be any well-known plastic tape, and in a preferred embodiment is Mylar tape, manufactured by the Du Pont Corporation. The metallic backing 11b may be any flexible metal, and in a preferred embodiment is aluminum. In a preferred embodiment the thickness of the metallic strip is approximately .00035 inch, while the thickness of the translucent portion is approximately .002 inch.

The message which is to be displayed on the tape is entered into the data processor device 23 which processes the information and activates the printing and developing station 13. At printing and developing station 13 there are provided selected electrostatic charge patterns no the tape 11 in accordance with the massage to be printed. The metal strip 11b is desirable in order to "hold" the electrostatic charges on the tape, as is explained in detail in the above-mentioned patent applications. After the tape has been subjected to the selective electrostatic charging, it is passed through powdered ink. The ink particles are attracted to the tape and positioned in accordance with the selected charge pattern to form the characters 25 on the surface of the tape section 21 in FIG. 2.

After careful consideration of the description thus far it will be evident that it would be possible to print a message along the entire surface of tape 11, assuming that metallic backing 11b was provided along the entire length of tape 11. However, if the tape is used in this manner a problem arises with respect to the readability of characters printed on the spliced area 27. It has been found that symbols selectively charged for printing on the spliced area are not sufficiently charged due to the double thickness of the tape which permits some of the ink to "not hold" causing their readability to be unacceptable. It has also been found that symbols printed on the spliced area have distorted shapes due to the overlap. Likewise, if a tape which has clamped ends is used in this manner the same problem arises with respect to the readability of the printing at the gap, or point of joining the free ends. In order to overcome this problem the present invention makes use of the splice to provide a sprocket signal, or a marker signal. The tape 11a is translucent and the metallic backing 11b is opaque. The metallic backing 11b in the spliced area is removed and a beam-of-light station 29 is provided through which the tape is routed. When the splice 27 arrives between the light source 31 and the light-sensitive device 33 the light passing from the source 31 through the translucent splice 27 causes a signal to be generated by the light-sensitive device 33. The signal thus generated is indicative of the presence of the splice at the beam-of-light station. If the splice is used as a marker position and a signal is generated in response to the marker's presence, then the equipment can be signalled to stop printing when the splice approaches the printing head and further signalled to print after the splice has travelled past the printing head. In this way the unacceptable printing on the spliced area is eliminated.

In the arrangement shown in FIG. 1 it was determined that the entire length of the tape was far in excess of the length necessary to display any weather message, and therefore to make optimum use of the tape a second marker 35 was provided by removing the metallic backing 11b at the area of marker 35. If the message lengths are sufficiently small or the tape length sufficiently long then any number of markers can be added to the tape by simply removing the metallic backing. The distance between marker 35 and splice 27 constitutes the length of tape necessary to position the tape in order to stop its movement and thereby display the message. If tape 11 were removed from the mechanism and laid out in a circle the marker 35 and splice 27 would be 180° apart.

In FIG. 1 the endless tape 11 is wound around four idler wheels 37, 39, 41 and 43. The tape 11 is further would around the drive drum 45. The idler wheel 41 is mounted on a movable arm 47 which is pulled by spring 49 to provide a tension device in order that the tape can be held rigidly. The drive drum 45 is driven through the clutch mechanism 51 by the motor 53. The clutch 51 may be any one of a number of clutch devices but is shown as a friction-type clutch. The clutch as shown comprises a friction wheel 54 which is pinned to the shaft 55 of the motor 53, and a ratchet wheel 56 which is pinned to the shaft 57 of drum 45. The friction disc 54 drives the ratchet wheel by friction and when the ratchet wheel 56 is engaged by the stop pawl 59 the friction wheel 54 continues to rotate but the ratchet wheel's motion is stopped.

Consider the steps which occurred in printing the weather message shown in FIG. 2 on tape section 21. When the message on tape section 21 commenced to be printed the splice 27 was in the position whereat marker 35 is shown in FIG. 1 and vice versa.

As the tape was driven by motor 53 through the mechanical linkage of clutch 51 and drum 45, the splice 27 moved past the section bounded by points 17 and 19, past the idler wheels 39 and 41 and finally between the light source 31 and the light-sensitive device 33. Since the plastic portion 11a of the tape is translucent, and there is no opaque backing at the splice, the light from source 31 passes through the splice 27 to the light-sensitive device 33 to generate a signal. With switches 61 and 62 positioned as shown in FIG. 1, the signal generated by the light-sensitive device 33 is transmitted through the amplifier 65 to energize the latching relay 67. The latching relay 67 in turn energizes a core which pulls the stop pawl 59 into position to engage the ratchet wheel 56 and thereby stop the movement of the tape. When the splice 27 is positioned between light source 31 and light-sensitive means 33 the message on tape 11 is located between positions 17 and 19. It becomes clear then that the splice 27 serves as a marker means or as a means for providing a sprocket signal, since the system moves the tape until the splice is so positioned that the message can be properly displayed and in response to this position of the splice the tape is stopped.

When the next message is to be displayed the data processor 23 transmits a signal to unlatch latching relay 67 and thereby permits the stop pawl 59 to disengage from the ratchet wheel which in turn is engaged by friction wheel 54 to drive the tape. In FIG. 1 there are shown some printed characters 69 which are part of an old message. The portion of the tape carrying the characters 69 is driven through the erasure station 15 whereat these characters are removed. Simultaneously new characters are being printed at point 71 as the clean tape passes the printing head 13. The new message will be moved to its display position in a fashion similar to the one just described, and in particular when the marker area 35 comes between the light source 31 and the light-sensitive device 33 the tape will be stopped with the new message to be displayed being located between the points 17 and 19.

Depending upon the design needs of the system, switches 61 and 63 can be respectively transferred to their other points 73 and 75 so as to energize light source 77 and connect into the amplifier circuit of inverter 79. This signal arrangement is used when the metal backing 11b is of a reflecting nature and the light source 77 transmits a light beam which is reflected by the metal backing 11b to the light sensitive device 33. The signal from light-sensitive device 33 is continually inverted and amplified and has no effect on latching relay 67. However, when a marker such as splice 27 moves into position as shown in FIG. 1, the light from light source 77 will no longer be reflected to light-sensitive device 33, and therefore the signal from light-sensitive device 33 will be inverted, and amplified to provide an effective signal at latching relay 67. The remainder of the operation is identical to the operation described in connection with light source 31 and light-sensitive device 33.

If a tape which has its ends clamped so that the ends abut each other is used, the metallic backing is removed from the clamped area and the operation is identical to that described above. The present invention has been found to be useful with high speed operations. For instance in the system shown in FIG. 1 the printing of the symbols is up to 3000 bauds (at the rate of 375 characters per second).

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A system for moving a spliced endless tape a discrete distance so as to minimize any interference with the system operation which might result from the presence of the splice comprising: a translucent endless tape having a splice; said tape having a backing which reflects light except at the area of said splice; a light source positioned in the proximity of said tape opposite the light reflecting surface of said backing; light detecting means positoned to receive said light after said light has been reflected from said backing; tape driving means engaged with said endless tape; and circuitry means connecting said light detecting means to said driving means to enable an interruption of the movement of said tape when the presence of said splice is detected by an absence of reflected light being received by said light detecting means.

2. A system for moving a message display tape a plurality of discrete distances to display a plurality of messages comprising: an endless translucent tape having its free ends joined at a common position; said tape having a backing excepting at a plurality of selected areas including the area of said common position to provide a plurality of markers; the distance of said tape between a pair of markers being at least the length of tape necessary to display a message; a light-sensitive means; a source of light located in the proximity of said tape to transmit light through said tape to said light-sensitive means; the transmission of said light to said light-senstive means being determined by the presence and absence of said backing to thereby generate marker signals; tape-driving means engaged with said endless tape; and circuitry means connecting said light-sensitive means to said tape-driving means to enable an interruption of a movement of said tape when the presence of one of said markers is detected.

3. A system for moving a message display tape a plurality of discrete distances to display a plurality of messages comprising: an endless translucent tape having its free ends joined at a common point; said tape having an opaque backing excepting at a plurality of selected areas including the area of said common point to provide a plurality of markers; the distance on said tape between a pair of markers being at least the length of the tape necessary to display a message; a source of light located in the proximity of said tape; a light-sensitive means to receive light passing through said marker positions; tape-driving means engaged with said endless tape; and circuitry means connecting said light-sensitive means to said tape driving means to enable an interruption of a movement of said tape when the presence of one of said markers is detected.

4. A system for moving a message display tape acocrding to claim 3 wherein said free ends are joined by a splice.

5. A system for moving a message display tape according to claim 3 wherein said free ends are positioned to abut one another and are held in such position by a clamping device.

6. A system for moving a message display tape a plurality of discrete distances to display a plurality of messages comprising: an endless translucent tape having a splice; said tape having a reflecting backing excepting at a plurality of selected areas including the area of said splice to provide a plurality of markers; the distance of said tape between a pair of said markers being the length of the tape necessary to display a message; a source of light located in the proximity of said tape facing the reflecting surface of said reflecting backing; a light-sensitive means to receive light reflected from said reflecting backing excepting when said light passes through said marker positions; tape-driving means engaged with said endless tape; and circuitry means connecting said light sensitive means to enable an interruption of a movement of said tape when the presence of one of said markers is detected.

References Cited in the file of this patent

UNITED STATES PATENTS

| | | |
|---|---|---|
| 1,953,072 | Casper | Apr. 3, 1934 |
| 2,086,554 | Hoorn | July 13, 1937 |
| 2,129,847 | Knodel | Sept. 13, 1938 |
| 2,143,214 | Selenyi | Jan. 10, 1939 |
| 2,952,416 | Sampson | Sept. 13, 1960 |
| 2,971,716 | Sampson | Feb. 14, 1961 |

FOREIGN PATENTS

| | | |
|---|---|---|
| 808,096 | Great Britain | Jan. 28, 1959 |